(12) United States Patent
Stern et al.

(10) Patent No.: US 7,113,998 B1
(45) Date of Patent: Sep. 26, 2006

(54) SYSTEM AND METHOD FOR GROUPING RECIPIENTS OF STREAMING DATA

(75) Inventors: Edith H. Stern, Boca Raton, FL (US); Barry E. Willner, Briarcliff Manor, NY (US); Victor S. Moore, Boynton Beach, FL (US); James M. Dunn, Ocean Ridge, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/497,774

(22) Filed: Feb. 3, 2000

(51) Int. Cl.
- *G06F 15/16* (2006.01)
- *H04N 7/20* (2006.01)
- *H04N 7/173* (2006.01)
- *H04N 7/16* (2006.01)

(52) U.S. Cl. .............. 709/231; 725/74; 725/105; 725/135

(58) Field of Classification Search .............. 709/217, 709/231, 212, 203, 204, 232; 370/352, 466, 370/230, 260; 725/87, 92
See application file for complete search history.

(56) References Cited

U.S. PATENT DOCUMENTS

| | | | | |
|---|---|---|---|---|
| 5,532,937 A | * | 7/1996 | Graziano et al. | 709/204 |
| 5,561,637 A | * | 10/1996 | Dan et al. | 365/230.03 |
| 5,592,612 A | * | 1/1997 | Birk | 714/6 |
| 5,815,662 A | * | 9/1998 | Ong | 725/92 |
| 5,832,198 A | * | 11/1998 | Lucht | 714/6 |
| 5,832,229 A | * | 11/1998 | Tomoda et al. | 709/227 |
| 5,928,327 A | * | 7/1999 | Wang et al. | 725/88 |
| 5,938,734 A | * | 8/1999 | Yao et al. | 709/232 |
| 5,953,506 A | * | 9/1999 | Kalra et al. | 709/231 |
| 5,956,321 A | * | 9/1999 | Yao et al. | 370/230 |
| 6,104,705 A | * | 8/2000 | Ismail et al. | 370/260 |
| 6,128,649 A | * | 10/2000 | Smith et al. | 709/217 |
| 6,195,680 B1 | * | 2/2001 | Goldszmidt et al. | 709/203 |
| 6,209,024 B1 | * | 3/2001 | Armstrong et al. | 709/212 |
| 6,212,657 B1 | * | 4/2001 | Wang et al. | 714/746 |
| 6,336,119 B1 | * | 1/2002 | Banavar et al. | 707/104.1 |
| 6,359,902 B1 | * | 3/2002 | Putzolu | 370/466 |
| 6,377,996 B1 | * | 4/2002 | Lumelsky et al. | 709/231 |
| 6,378,036 B1 | * | 4/2002 | Lerman et al. | 711/112 |
| 6,411,616 B1 | * | 6/2002 | Donahue et al. | 370/352 |
| 6,415,326 B1 | * | 7/2002 | Gupta et al. | 709/231 |
| 6,418,473 B1 | * | 7/2002 | St. Maurice et al. | 709/231 |

(Continued)

OTHER PUBLICATIONS

Darrin Woods, Tutorial: the Wizardry of Multicast, Feb. 19, 2001, URL: http://www.networkcomputing.com/shared/printArticle?article=nc/1204/1204f1cfull.html&pub=nwc.

*Primary Examiner*—Ayaz Sheikh
*Assistant Examiner*—Christian LaForgia
(74) *Attorney, Agent, or Firm*—Jose Gutman; Jeffrey N. Giunta; Fleit, Kain, Gibbons, Gutman, Bongini & Bianco P.L.

(57) ABSTRACT

A data stream is transmitted to groups of individuals making separate requests for the data stream. The groups may be arranged by placing a maximum number of requesters in a group or by grouping the requesters making requests within a discrete period of time. The individual requester may be shifted from group to group or from a data store to another data store location to change the location in the data stream from which the data is sent to an individual requester or the time of transmission of the data sent from the data store.

38 Claims, 5 Drawing Sheets

U.S. PATENT DOCUMENTS

| | | | |
|---|---|---|---|
| 6,564,262 B1 * | 5/2003 | Chaddha | 709/231 |
| 6,571,391 B1 * | 5/2003 | Acharya et al. | 725/87 |
| 6,691,208 B1 * | 2/2004 | Dandrea et al. | 711/112 |
| 6,704,790 B1 * | 3/2004 | Gopalakrishnan | 709/231 |
| 6,728,775 B1 * | 4/2004 | Chaddha | 709/231 |
| 6,732,183 B1 * | 5/2004 | Graham | 709/231 |

* cited by examiner

SYSTEM AND METHOD FOR GROUPING RECIPIENTS OF STREAMING DATA

BACKGROUND OF THE INVENTION

1. Field of the Invention

This invention relates in general to the transmission of data in a data stream over a telecommunications medium such as the Internet and, more particularly to the placement of recipients of that streaming data into identifiable groups by space or time, relative to the streaming data, to avoid congestion of users making demands for the streaming data substantially at the same time or at the same place in the data transmission.

2. Description of the Prior Art

Streaming data transmitted through the Internet, is a well-known technique for sending data expected to be received in a continuous form. Such data, for example, may be the current prices at the New York Stock Exchange, or video data such as a replay of a sport highlight or a fashion show. While the resources which may be allocated for transmitting the data may be adequate in many cases, at other times, the resources for sending the data may be inadequate for the task relative to the number of recipients demanding the data at substantially the same time or at the same place in the data base or data store. The consequence of any such inadequate resource allocation will be congestion and disappointed recipients who demand the data but are placed low or out of the queue because there are an insufficient number of servers, for example, to retrieve the data from the store and place it on the Internet for transmission to the recipients.

Other entities which receive demands, as described above, placing an overload on the resources used to transmit the streaming data might supply music or even static web pages. Any such demand, coming from the recipient end of the transmission medium, cannot be predicted until the demands for data are made. At the same time, the recipient expects the demand to be instantly satisfied by immediate connection to the data and to promptly begin enjoying the show or the web pages or the music or whatever may be represented or contained in the data stream.

Accordingly, there is a need for managing demands or requests made at substantially the same time or at the same location in the data stream, which may be beyond the system capability for supplying the information within the time expected and which reduces this peak load and shifts it over the space of the data transmission while preserving the impression of immediate satisfaction for each information recipient.

SUMMARY OF THE INVENTION

As disclosed in a preferred embodiment, according to the inventive principles disclosed a system and method is shown for spreading the load placed on a transmission facility to drive a condition of load peaks toward a steady state condition. The system and method shown, may be described as virtually personalizing streamed data to a respective recipient or user, preserving the impression to the individual recipient that it is being immediately served with a requested data file or video or audio data feed, while at the same time, that individual recipient is being shifted in time or space, relative to the data transmission and data file or data feed, as requested. The system includes a server having a data store, with an interface for connection to a telecommunications medium and a data processor for receiving recipient's or users' requests for information to be sent in a data stream by said server over said telecommunications medium. The server, responsive to the requests, arranging the recipients or users in groups with each of the users being arranged in a respective group; and with the data processor sending the data stream from the data store, to the groups. The server can realign a respective user with a said data stream to change the location in said data stream from which the user is receiving the data, for example, by moving a pointer associated with the user's respective socket to another location in said data store, or the position of the user relative to the data in the data stream can be changed in relation to the time of the data being transmitted in said data stream, by realigning the user or recipient with a different server socket and port delivering or transmitting a time shifted part of the data transmission. As used in connection with the description of a preferred embodiment and according to the disclosed inventive principles or as claimed, a server may be any suitable device capable of performing the described or claimed functions or method steps, as may be known to one skilled in the art now or in the future and is not limited to any particular arrangement of elements for performing such server functions or steps. As would be known to one skilled in the art, by server is meant any device and its equivalents arranged to performed such functions or method steps, described or claimed in relation to a server whether described in its elemental parts or as a single unit or generally as a means performing a function.

As stated above, according to the inventive principles as disclosed in connection with the preferred embodiment, an allocation of server resources is used to reduce peak loads and drive a system for providing data in a stream for example, on demand, by grouping the users demanding the data. Such groups may be identified by time of demand or place of demand or by any other scheme for identifying the users without departing from the principles of the disclosed invention. According to the inventive principles as disclosed in connection with the preferred embodiment, the groups are assembled by a number limited with respect to the available servers available to transmit the requested data as disclosed with regard to the example shown for an Internet connection. Another such system for grouping users may be by the time of request, for example by grouping users requesting the data within a set period. According to the inventive principles as disclosed in connection with the preferred embodiment, these systems may be combined, for example, by grouping the next 10 users or the next users making a request in the next 10 seconds, whichever comes first.

Once the groups are assembled, a server may associate all of the users in a respective group with a server and a socket aligned with a pointer to a data location in the data store accessed or read to produce the data transmission. As successive groups are assembled, according the system chosen, the users or recipients in the successively assembled groups may be started at the current instant in time or in the current data location being transmitted from the data store, to all of the previous groups. In that case, each user or recipient may be added at the data transmission is in progress. A data loop may be employed to transmit the data continuously so each user or recipient may receive the whole content, as the data transmission progresses through its loop and starts again. In this way, users or recipients may be entering or receiving the data transmission or leaving and terminating the data transmission, as the data transmission returns to the time or data location of an individual's connection to the data, individually, without disturbing any other recipient. If the system is arranged to terminate a group and its users when a loop transmission is at its logical end, according to the inventive principles as disclosed in connection with the preferred embodiment, the user may request a reconnect to another group in formation or be automatically place in another such group, to receive the portion missed, for example from the beginning.

Where the system uses data in the form of signaling between the recipient or user and the server to acknowledge successful receipt of the data or to signal data loss, the system may be arranged, according to the inventive principles as disclosed in connection with the preferred embodiment, to continue the transmission without providing the lost data, or alternatively, the user or recipient can be moved to another group receiving the data transmission from a time in the data transmission corresponding to the lost data portion.

According to the inventive principles as disclosed in connection with the preferred embodiment, the user or recipient may be moved relative to the time or data store location of the data transmission, by moving the recipient or user to successive groups or server connections associated with different parts of the data. In this way, the user may be alternatively connected, for example and according to the inventive principles as disclosed in connection with the preferred embodiment, with selected material such as advertisements interspersed in the data transmission.

The systems or data protocols for signaling the successful receipt of data or loss of data as well as the systems and methods for assembling users requesting data and assembling such users in a group by time of request or in a group by the group size, is well known to those of ordinary skill in the art and not described. As used in describing the invention according to the inventive principles as disclosed in connection with the preferred embodiment, the transmission of data as described in a data stream or as streaming data is not to be limited to a continuous data stream but may include discontinuous data or data which is sent in frames or in any other relationship, or a data file transmitted repetitively.

DESCRIPTION OF A PREFERRED EMBODIMENT

Figure 1:
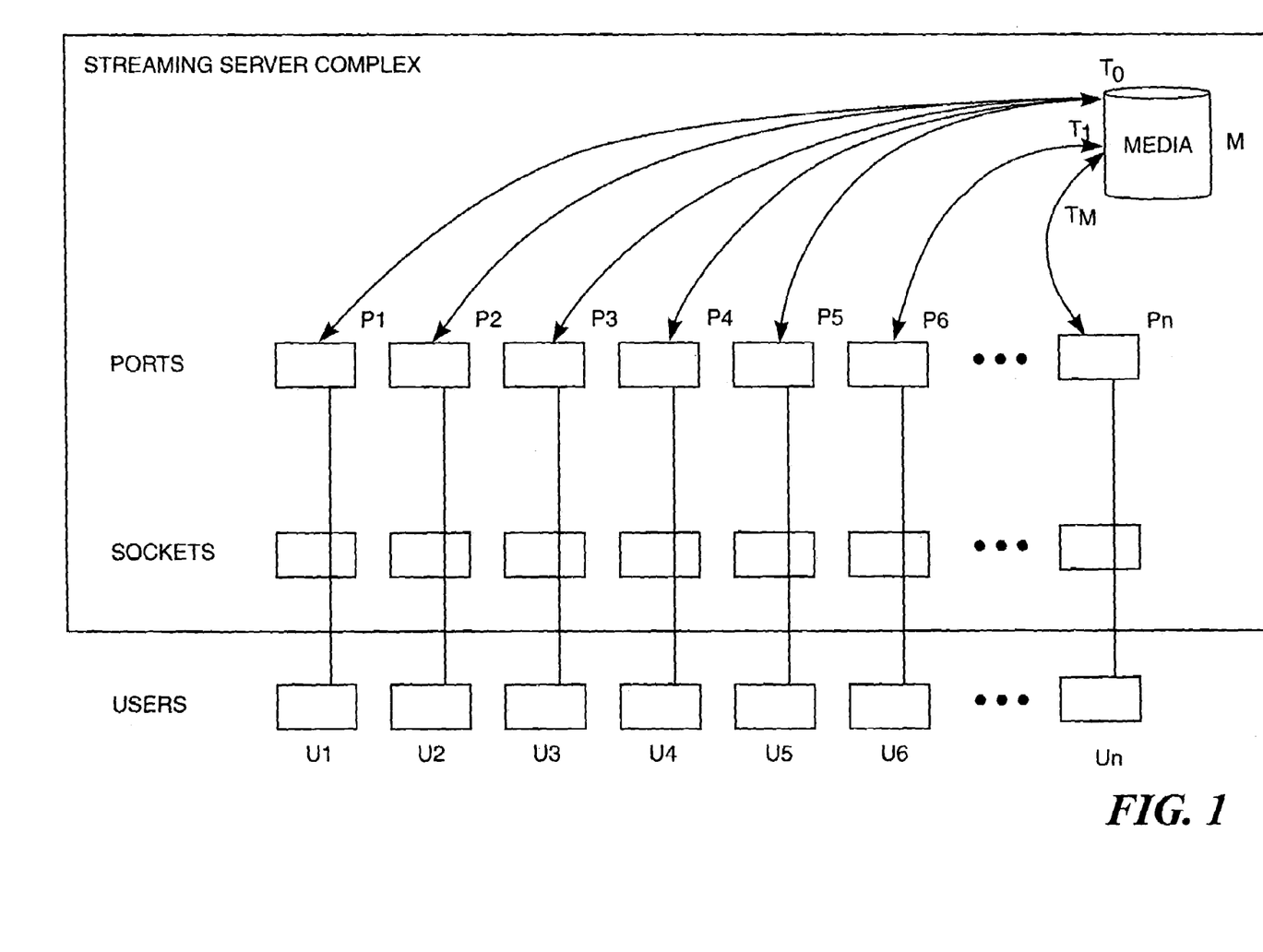
FIG. 1 is a block diagram showing an exemplary system for serving streaming data individually on a one to one relationship through individual server ports and sockets matched to each such user or recipient.

A system for transmitting data in a data stream or streaming data, directly to individual users, is shown in FIG. 1. As shown, each user U1, U2, . . . Un, is associated with a respective port and socket in a server. As would be well known to one of ordinary skill in the art, a socket may be an arrangement of data and command standards for designating addresses, data structure and data signaling standards.

Figure 2:
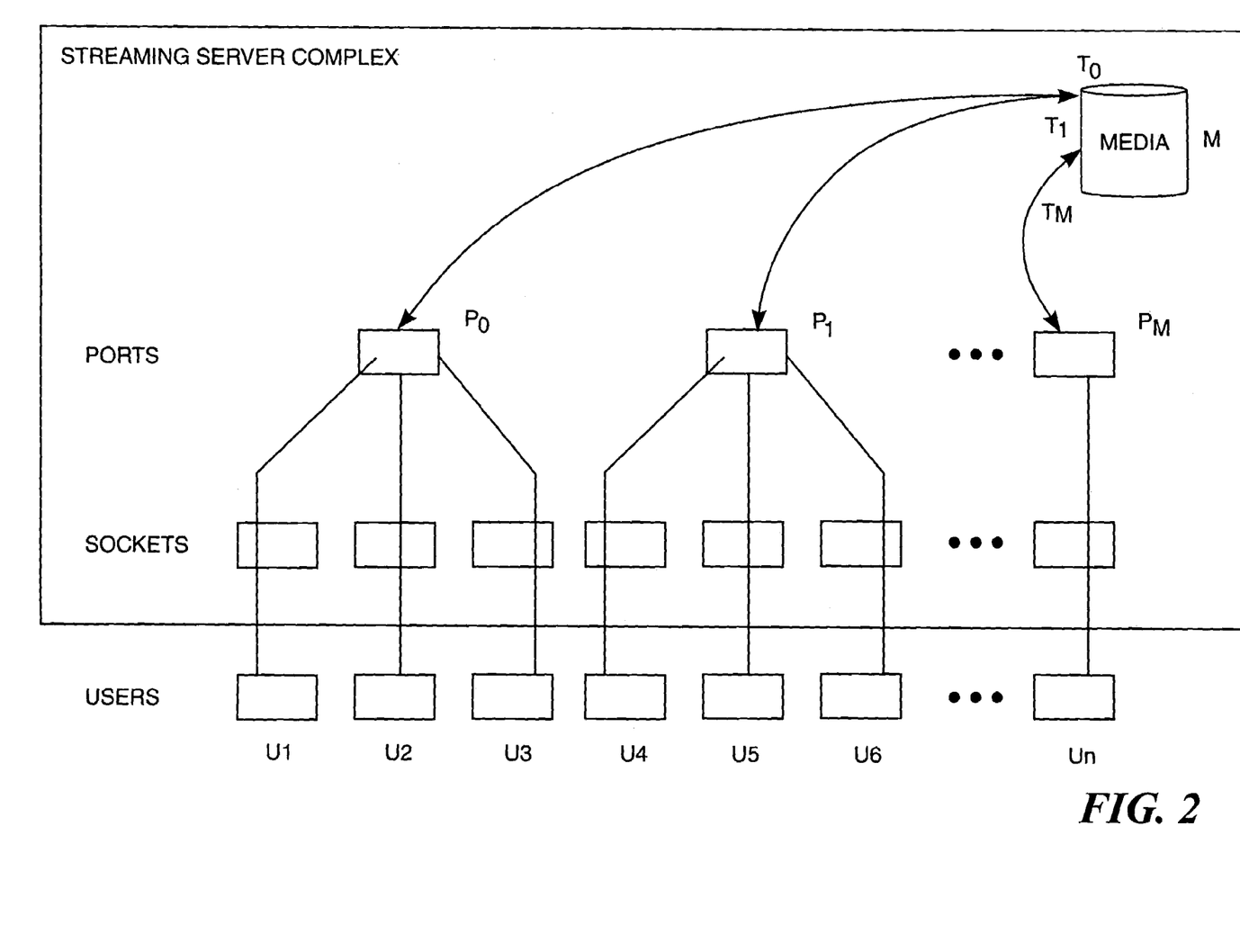
FIG. 2 is a block diagram illustrating users or recipients that are grouped so each user or recipient in a respective group receives the same data from the same port, according to a preferred embodiment of the present invention.

According to the inventive principles as disclosed in connection with the preferred embodiment, in one example, shown in FIG. 2, where data is sent in blocks or in packets, as known to those of ordinary skill in the art, lost data may be identified by identifiable blocks or packets of data, and the user, when assembled in a group according to the principles of the invention, may be realigned with the data transmission to recover the lost data. As shown in FIG. 2, the users are associated in groups and assembled by number or time of request, as described above. For example, users U1, U2, and U3, are assembled into a group to receive the data transmission from server port P0 currently associated with time T0 in the data stream, through user respective sockets connected to that port. Similarly, U4, U5, and U6 are assembled as described above, into another respective group to receive the data transmission shifted with respect to the data transmission from port P1, associated with time T1 in the data stream, through the users' respective sockets. This arrangement may be repeated to users Un-2, Un-1 and Un, for example. In the example shown in FIG. 2, users U1 to U3 are at point T0 in the data transmission and users U4 to U6 are at point T1, and so on. As stated above, the users U1 to Un, may be assembled in groups by grouping a discrete number of requesting users or by grouping users, requesting the data transmission within a designated time.

Figure 3:
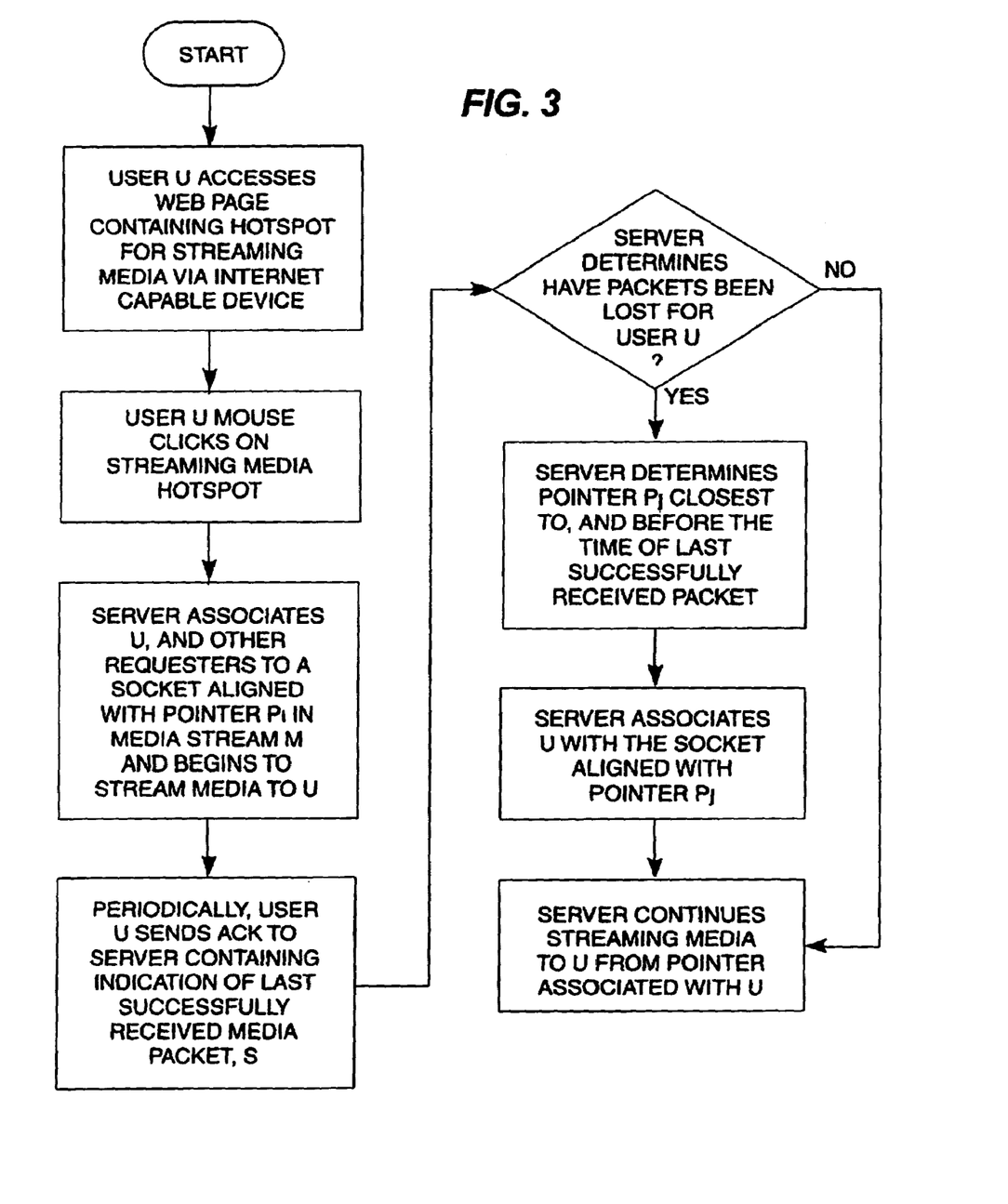
FIG. 3 is a flow diagram for an exemplary system for resetting a user to a different location in the data, according to a preferred embodiment of the present invention.

In the example shown in FIG. 3, the system for shifting groups of users is described in a block diagram. In a typical application, a user may request a data transmission at some point in the data flow, whether at the beginning or after. The user may make its request because of an announcement of an event to start at a specified time or randomly, depending on when the user first hears of the event and desires to access the data. For example, an announcement of the rebroadcast of the President's State of the Nation speech at a designated time may cause more individual users to access the available servers than there are servers available to immediately provide the data. In that case, the system, to provide to the user a virtual personalized data transmission, arranges the users in respective groups, defined for example, by respective server port or with a respective socket aligned with a pointer Pi at a respective location in the data store and media stream M. At that time, the server may begin to transmit the data from the store M to the users associated with the respective socket and pointer Pi. Where a data signaling system is used to indicate the successful transmission of data, the pointer is advance to the next location in the media stream M for transmission. Where there is an indication of lost data, the server may reconnect the user suffering lost data with another server port and socket aligned with a pointer Pj closest to, and before, the identified lost blocks or packets or otherwise identified data. The server then would continue to be used to transmit the data as before, with the only change being the user's location in the stream media M connected to the user.

Figure 4:
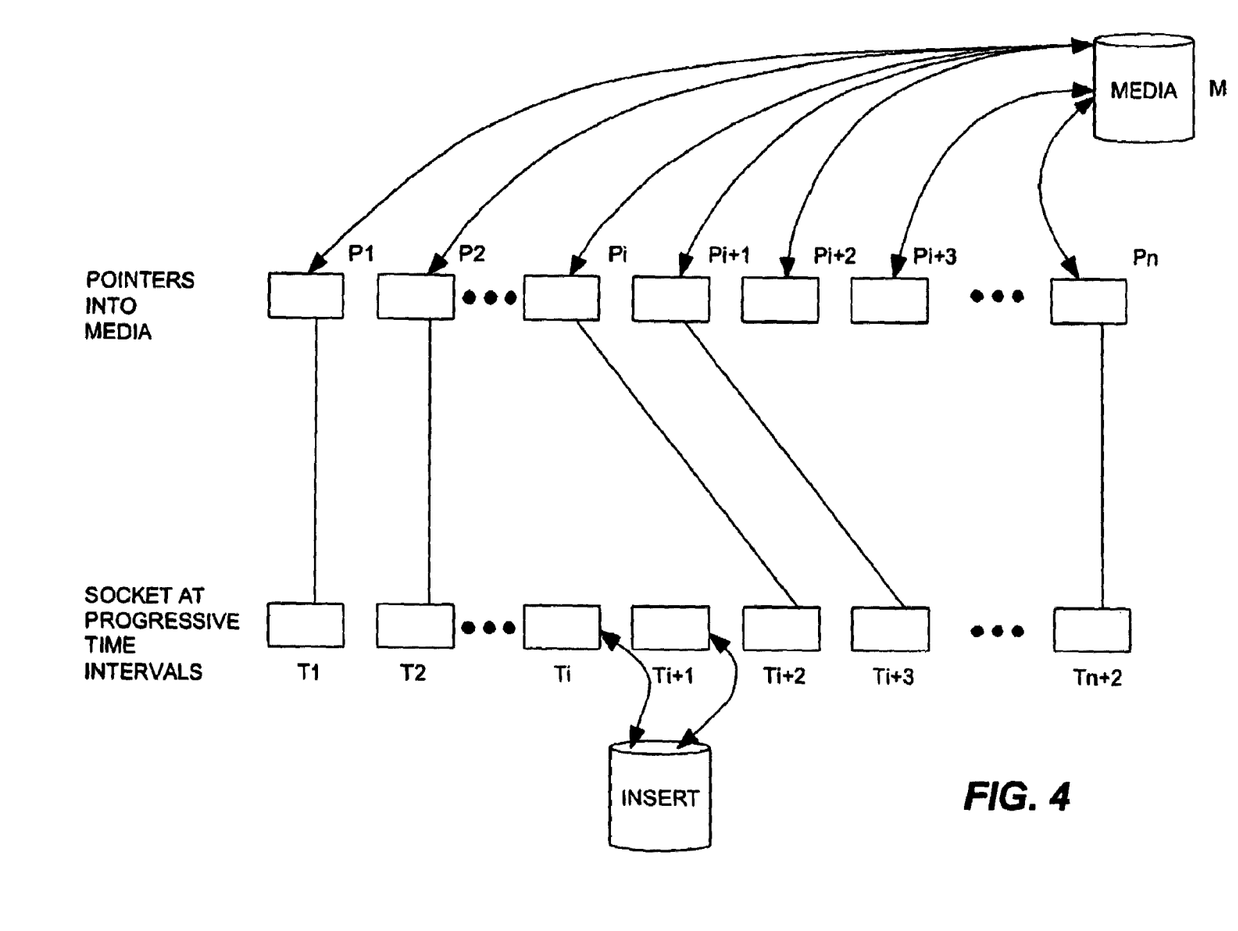
FIG. 4 is a block diagram, according to the inventive principles as disclosed in connection with the preferred embodiment, illustrating a system for shifting users between ports receiving or accessing respective locations in the data store, for example, to shift the user within the data transmission or to shift the user to material inserted into a data stream.

FIG. 4 shows the system and method according to the inventive principles as disclosed in connection with the preferred embodiment, with a user associated with a single socket at various time intervals T1, T2, T3 . . . Ti, Ti+1, Ti+2. In the disclosed example, the socket for a user is connected with a pointer to the media M. Where new material is to be inserted into the data transmission, for example at time Ti, and time Ti+1, the socket is moved from pointer Pi to a pointer accessing the inserted material, which would be from another location in the data store or from another data store. At time Ti+2, at the end of the inserted material, the socket is again reconnected with pointer Pi and the data transmission resumed. Alternatively, a user associated with a pointer, P1 for example, may be time shifted to another location in the data stream, for example time Ti+2, by associating that user with another socket associated with respective pointer Pi+1. There is no restriction on the time spent in streaming inserted material or on the number of inserts or on the time interval shifted for any user in a group as it is accomplished by shifting that user to another group associated with a different pointer into the data media M or to a socket receiving the data at a different time location in the data stream.

According to the inventive principles as disclosed in connection with the preferred embodiment, the invention may be practiced using one or more general purpose computers responsive to one or more software programs prepared or written to perform the functions or the steps, described, as would be known to one of ordinary skill in the art.

The invention shown according to the inventive principles as disclosed in connection with the preferred embodiment is not limited to the examples shown. The data storage, access, serving and transmission systems and data signaling and protocol systems for arranging data into identifiable parts for recognition, interpretation and routing, may be any suitable systems presently available or as may be developed and as would be known to those of ordinary skill in the art.

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in art. According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium which may be used to hold or contain the computer program product, may be a fixture of the computer such as an embedded memory or may be on a transportable medium such as a disk, as would be known to one of ordinary skill in the art. The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits. Furthermore, the computer readable medium may include computer readable information in a transitory state medium such as a network link and/or a network interface, including a wired network or a wireless network, that allow a computer to read such computer readable information.

Figure 5:
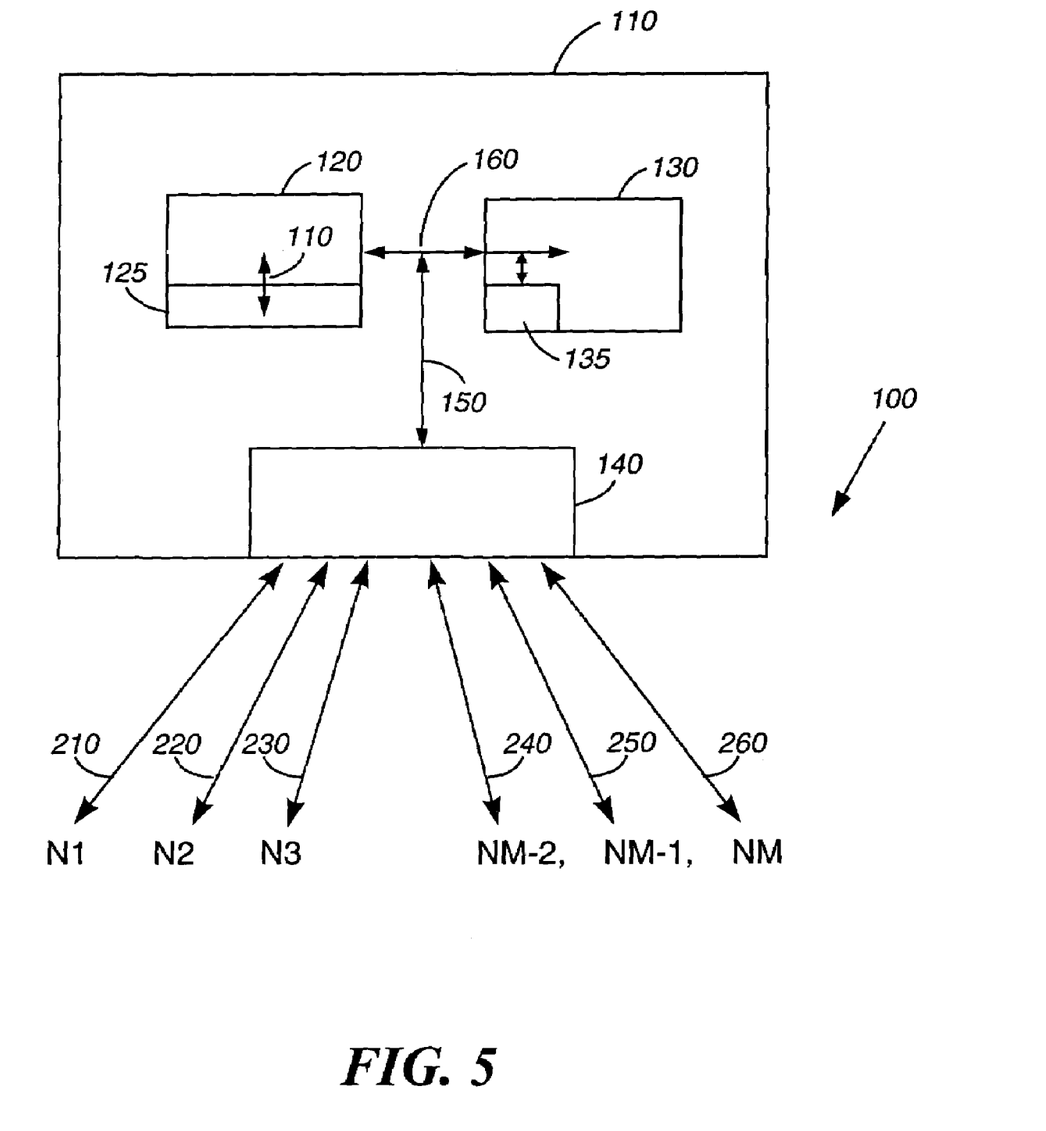
FIG. 5 shows in a block diagram an example of a networked server as may be used in connection with the disclosed invention.

By way of example and without limiting the principles of the invention as disclosed, an example of a networked system for receiving users' requests for data, for arranging the users in groups with respect to the time or location in the data, and for sending the data in separate respective data streams to the respective groups, is shown generally by numeral 100 in FIG. 5. The system includes a server 110 having a data processor 120 and memory 125, with data store 130 and interface 140 for connection to a network such as for example, the World Wide Web or Internet, using a suitable a software program such as a web browser. Data flow within the server 110 is as shown by bi-directional arrows 150, 160 170. A suitable computer program 135, as would be known to one of ordinary skill in the art, could be stored within data store 130 for transfer to processor memory 125 and use by processor 120 for performing the disclosed functions and method steps. As would be understood by those of ordinary skill in the art, the computer program may be contained or recorded in any suitable active or dynamic, stable or interim memory, as currently available or as may be developed by processor 120. As shown in FIG. 5, interactive connections are made with users n1, n2, n3 . . . nm−2, nm−1, nm. Information in the form of requests and data in the form of streaming data is shown by the respective bi-directional arrows 210, 220, 230, 240, 250, 260. As would be known to one of ordinary skill in the art, the system of FIG. 5 is shown by way of example without limiting the disclosed invention.

Although specific embodiments of the invention have been disclosed, it will be understood by those having ordinary skill in the art, that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A system for transmitting data in a data stream to grouped recipients, comprising:

a server, for receiving users' requests for transmission of user requested data in a data flow for reception by a plurality of users;

said server for transmitting a plurality of data transmissions, each of the plurality of data transmissions transmits the user requested data at one respective point of transmission location that is different than other data transmissions within the plurality of data transmissions;

said server for defining a plurality of groups, wherein each group in the plurality of groups is assigned to receive a respective data transmission within the plurality of data transmissions, the respective data transmission corresponding to a respective point of transmission location within the user requested data;

said server, independent of said user requests for data and while preserving the impression to individual users requesting data that each is being immediately served with requested data, for arranging a plurality of users into each of a respective group within the plurality of groups; and said server, responsive to the arrangement of the users in said plurality of groups, for transmitting the plurality of data transmissions to each user according to each user's assigned group so that each of the plurality of users assigned to a particular group receives data from the same location within the user requested data;

and wherein the server is further for realigning a first user within the plurality of users from a first group within the plurality of groups, the first group corresponding to users receiving user requested data at a first location in the user requested data, to a second group, the second group corresponding to users receiving user requested data at a second location in the user requested data, so as to cause the first user to receive the same data as a second user previously assigned to the second group; the second location being selected by the server, independent of said user requests for data, to change the location in the data from which the respective user is receiving the user requested data to any location in the user requested data other than the first location in the user requested data;

said server has a data communications interface for the transmitting of the plurality of data transmissions, wherein the data communications interface comprises a plurality of ports with each of said plurality of groups associated with a respective port, wherein each respective port transmits the respective data transmission corresponding to its connected group wherein each user assigned to a respective group is connected to the respective port for that respective group; and said server, realigning said first user to said second group by reconnecting said first user to another of said respective ports.

2. The system of claim 1, wherein, said server realigns the first user responsive to a signal from said respective user.

3. The system of claim 1, wherein, said server arranges said users into said groups arranged by the size of said group.

4. The system of claim 1, wherein, said server arranges said users into said groups based upon a time interval in which said users requests were received.

5. The system of claim 1, wherein, said server is limited to a maximum number of said groups and arranges said groups to maintain said maximum number.

6. The system of claim 1, wherein, said telecommunication medium is the Internet.

7. The system of claim 1, wherein, said user's requests are received from a world wide web browser.

8. The system of claim 1, wherein,
said data is transmitted with identifiable locations in said data flow;
said server identifying a respective identifiable location in said data stream corresponding to said request; and
said server, realigning said first user to said second group, said second group receiving said data flow from a specified location in said data flow related to said respective identifiable location.

9. The system of claim 8 wherein, said first location is advanced in time of transmission of said data flow relative to said respective identifiable location.

10. The system of claim 8, wherein, said first location is delayed in time of transmission of said data flow relative to said respective identifiable location.

11. The system of claim 1, further comprising:
means for signaling connected to said first user for sending discrete respective signals to said server;
said server, responsive to said discrete respective signals, realigning the first user from the first group to the second group, wherein one of the discrete respective signals specifies the second location; and
wherein, the first location and the second location are in discrete time steps relative to the point of transmissions for each of the plurality of data transmissions.

12. The system of claim 11, wherein, said discrete respective signals include signals for advancing or retarding a point of transmission for the respective data transmission assigned to the second group.

13. The system of claim 11, wherein, said discrete respective signals include signals for realignment in discrete intervals.

14. The system of claim 13, wherein said discrete intervals are intervals of space displacement in the location of said data in said data stream.

15. A system comprising:
a server for transmitting user requested data in a data flow for reception by a plurality of users requesting said data flow;
said server having means for connecting said server to a telecommunications network for transmitting a plurality of data transmissions, each of the plurality of data transmissions comprising a different point of transmission within the data flow; and
said server including means for responding to user requests for data, said user requests being received from the telecommunications network;
said server for defining a plurality of groups, wherein each group in the plurality of groups is assigned to receive a respective data transmission within the plurality of data transmissions, the respective data transmission corresponding to a respective different point of transmission within the data flow, so as to cause each user in a respective group to receive the dame data as all other users in the respective group;
the server for identifying the individual requesters as the source of respective user requests;
and wherein said server, independent of said user requests for data and while preserving the impression to individual users requesting data that each is being immediately served with requested data, arranging each of said individual requesters into a respective group, the respective group corresponding to a point of transmission of said data flow determined by time of request or by number of requests;
and the server for distributing the user load on said server and shifting said user load toward a steady state load on the server by distributing said users among the respective groups;
said server has a data communications interface for the transmitting of the plurality of data transmissions, wherein the data communications interface comprises a plurality of ports with each of said plurality of groups associated with a respective port, wherein each respective port transmits the respective data transmission corresponding to its connected group wherein each user assigned to a respective group is connected to the respective port for that respective group; and
said server, realigning said first user to said second group by reconnecting said first user to another of said respective ports.

16. The system of claim 15, wherein,
said groups are arranged by number of said individual requesters.

17. The system of claim 15, wherein,
said groups are arranged by the time of receipt of said requests.

18. The system of claim 15, wherein said server is limited to a maximum number of said groups; and wherein said server arranges said groups in relation to said maximum number.

19. The system of claim 15, wherein said telecommunications medium is the Internet.

20. The system of claim 15, wherein said user's requests are received from a world wide web browser.

21. The system of claim 15, wherein said server includes means for shining said respective individual requesters between said groups to change the data transmission received by said user.

22. The system of claim 15, wherein,
said user requested data is accessed from a data store communicatively coupled to the server; and
said server includes means for changing the location in the data store accessed for shifting the location of the user requested data relative to said data.

23. A method comprising the steps of:
receiving, at a server having a data store, users' requests for transmission of user requested data in a data flow for reception by a plurality of users across a telecommunications medium;
transmitting a plurality of data transmissions, each of the plurality of data transmissions transmits the user requested data at one respective point of transmission location that is different than other data transmissions within the plurality of data transmissions;
defining a plurality of groups, wherein each group in the plurality of groups is assigned to receive a respective data transmission within the plurality of data transmissions, the respective data transmission corresponding to a respective point of transmission location within the user requested data;
independent of said user requests for data and while preserving the impression to individual users requesting data that each is being immediately served with requested data, arranging a plurality of users into each of a respective group within the plurality of groups; and
realigning, at the server, a first user within the plurality of users from a first group corresponding within the plurality of groups, the first group corresponding to users receiving user requested data at a first location in the respective user requested data, to a second group, the second group corresponding to users receiving user requested data at a second location in the user requested data, so as to cause the first user to receive the same data as a second user previously assigned to the second group;
the second location being selected by the server, independent of said user requests for data, to change the location in the data from which the respective user is receiving the user requested data to any location in the user requested data other than the first location in the user requested data;
said server has a data communications interface for the transmitting of the plurality of data transmissions, wherein the data communications interface comprises a plurality of ports with each of said plurality of groups associated with a respective port, wherein each respective port transmits the respective data transmission corresponding to its connected group wherein each user assigned to a respective group is connected to the respective port for that respective group; and
said server, realigning said first user to said second group by reconnecting said first user to another of said respective ports.

24. The method of claim 23, wherein said step of arranging includes the step of arranging said groups in relation to a maximum number of said groups said server can send said data.

25. The method of claim 23, including the step of sending said data through the Internet.

26. The method of claim 23, including the step of receiving said user's requests from a world wide web browser.

27. The method of claim 23, wherein, said step of arranging includes the step of realigning a respective user with said data stream to change the relative position in the data stream of data being transmitted to said respective user, responsive to a signal from said respective user.

28. The method of claim 27, wherein, said data is transmitted with identifiable locations in said data stream, and the method further comprising the steps of:
identifying a respective identifiable location in said data stream corresponding to said user signal; and
moving said user to another of said groups receiving said data stream from a location in said data stream related to said respective identifiable location.

29. The method of claim 23, wherein, said step of arranging, arranges said users into said groups arranged by the size of said group.

30. The method of claim 23, wherein, said step of arranging, arranges said users into said groups arranged by a time interval for assembling said group.

31. In a system for transmitting data in a data stream sent from a server to a plurality of users requesting access to said data stream at substantially the same time, a method comprising the steps of,
sending at least one data stream from a server to a plurality of users that requested data from the server;
transmitting a plurality of data transmissions, each of the plurality of data transmissions transmits the user requested data at one respective point of transmission location that is different than other data transmissions within the plurality of data transmissions;
defining a plurality of groups, wherein each group in the plurality of groups is assigned to receive a respective data transmission within the plurality of data transmissions, the respective data transmission corresponding to a respective point of transmission location within the user requested data;
arranging, independent of said user requests for data and while preserving the impression to individual users requesting data that each is being immediately served with requested data, said plurality of users into each of a respective group within the plurality of groups, the plurality of groups comprising a first group and a second group, each of said groups for reception of a respective data transmission transmitted from the server;
moving, independent of said user requests for data, one of the plurality of users from said first group to said second group for reception, by said one of the plurality of users, of user requested data at a point of said data flow relatively displaced in space or time from reception by said first group, so as to cause said one of the plurality of users to receive the same data as a second user previously assigned to the second group;

said server has a data communications interface for the transmitting of the plurality of data transmissions, wherein the data communications interface comprises a plurality of ports with each of said plurality of groups associated with a respective port, wherein each respective port transmits the respective data transmission corresponding to its connected group wherein each user assigned to a respective group is connected to the respective port for that respective group; and said server, realigning said first user to said second group by reconnecting said first user to another of said respective ports.

32. A computer program product for use in operating a computer, the computer program product including computer instructions comprising instructions for:

receiving, at a server, requests for data from users, said data being organized for transmission in a data flow from a data store;

transmitting a plurality of data transmissions, each of the plurality of data transmissions transmits the user requested data at one respective point of transmission location that is different than other data transmissions within the plurality of data transmissions;

defining a plurality of groups, wherein each group in the plurality of groups is assigned to receive a respective data transmission within the plurality of data transmissions, the respective data transmission corresponding to a respective point of transmission location within the user requested data;

the server, independent of said user requests for data and while preserving the impression to individual users requesting data that each is being immediately served with requested data, arranging said users in each of a respective group within the plurality of groups, wherein each of said groups corresponding to reception of a respective data transmission;

distributing a user load on the server and shifting the user load toward a steady stat load on the server by distributing the plurality of users among the groups assigned by time of data stream transmission or by place in the data flow transmission; and responsive to said user's requests, sending said user requested data in at least one data stream from said data store to said groups with users assigned to a respective group within said groups all receiving the same data;

said server has a data communications interface for the transmitting of the plurality of data transmissions, wherein the data communications interface comprises a plurality of ports with each of said plurality of groups associated with a respective port, wherein each respective port transmits the respective data transmission corresponding to its connected group wherein each user assigned to a respective group is connected to the respective port for that respective group; and said server, realigning said first user to said second group by reconnecting said first user to another of said respective ports.

33. A system for transmitting data in a data stream to grouped recipients comprising:

a server, for receiving users' requests for transmission of user requested data in a data flow for reception by said users;

said server for transmitting a plurality of data transmissions, each of the plurality of data transmissions transmits the user requested data at one respective point of transmission location that is different than other data transmissions within the plurality of data transmissions;

said server for defining a plurality of groups, wherein each group in the plurality of groups is assigned to receive a respective data transmission within the plurality of data transmissions, the respective data transmission corresponding to a respective point of transmission location within the user requested data;

said server, independent of said user requests for data and while preserving the impression to individual users requesting data that each is being immediately served with requested data, for arranging said users into each of a respective group within the plurality of groups, with each user being arranged in a respective group of the plurality of groups, and wherein each user in each respective group receives an assigned respective data transmission and the same data as all other users in that respective group;

said server, responsive to the arrangement of said users in the plurality of groups, for transmitting said user requested data in said respective data stream to each said respective group, and wherein the server for realigning a respective user;

from a first respective group corresponding to said respective user receiving user requested data being transmitted at a first location in the user requested data;

to a second respective group corresponding to said respective user receiving transmission of said user requested data being transmitted at the first location in the user requested data, so as to cause the first user to receive the same data as a second user previously assigned to the second group, the second point in time being selected by the server, independent of said user requests for data, to change the relative time the respective user is receiving the transmission of said user requested data being transmitted at the first location in the user requested data;

said server has a data communications interface for the transmitting of the plurality of data transmissions, wherein the data communications interface comprises a plurality of ports with each of said plurality of groups associated with a respective port, wherein each respective port transmits the respective data transmission corresponding to its connected group wherein each user assigned to a respective group is connected to the respective port for that respective group; and said server, realigning said first user to said second group by reconnecting said first user to another of said respective ports.

34. The system of claim 33, wherein, said respective ports have a plurality of respective sockets and each of said users is connected to respective sockets according to the respective group to which the respective user is assigned;

said server has a plurality of points, each point associated with a respective socket, pointing into separate respective locations in said data store the server transmitting data retrieved from said separate respective locations in said data store to said respective users through respective sockets; and said server realigning the respective user from the first group to the second group to change a time in the transmission in said data flow said user is receiving by reconnecting said respective user to another respective socket associated with another respective pointer.

35. The system of claim 33, wherein
each of said ports have a plurality of respective sockets and said respective users are each connected to a respective socket;
said server has a plurality of pointers, each pointer associated with a respective socket, pointing into separate respective locations in said data store, the server transmitting data retrieved from said separate respective locations in said data store to said respective users through said respective sockets; and
said server realigning the respective user from the first group to the second group to change a time in the transmission in the transmission in said data flow said user is receiving by moving said pointer for a respective socket to another location in said data store.

36. The system of claim 33, wherein,
said server includes means for disconnecting a respective user with said respective data flow at an identifiable location in said user requested data and for reconnecting said user to another data flow.

37. The system of claim 36, wherein,
said server includes means for disconnecting said respective user with said another data flow after a discrete interval and reconnecting said user with said data flow at said identifiable location.

38. The system of claim 37, wherein,
said server means for reconnecting said user with said data stream is a pointer for accessing data in said data store at discrete locations.

* * * * *